(12) United States Patent
Eleftheriou et al.

(10) Patent No.: US 9,298,378 B2
(45) Date of Patent: *Mar. 29, 2016

(54) LOGIC DEVICE

(71) Applicant: INTERNATIONAL BUSINESS MACHINES CORPORATION, Armonk, NY (US)

(72) Inventors: Evangelos S. Eleftheriou, Rueschlikon (CH); Robert Haas, Rueschlikon (CH); Xiaoyu Hu, Rueschlikon (CH); Peter Mueller, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/542,496

(22) Filed: Nov. 14, 2014

(65) Prior Publication Data

US 2015/0074343 A1 Mar. 12, 2015

Related U.S. Application Data

(63) Continuation of application No. 12/950,948, filed on Nov. 19, 2010, now Pat. No. 8,909,831.

(30) Foreign Application Priority Data

Nov. 27, 2009 (EP) ..................... 09177357

(51) Int. Cl.
G06F 13/12 (2006.01)
G06F 13/42 (2006.01)
G06F 3/06 (2006.01)

(52) U.S. Cl.
CPC ............ *G06F 3/0613* (2013.01); *G06F 3/0661* (2013.01); *G06F 3/0688* (2013.01); *G06F 13/4243* (2013.01)

(58) Field of Classification Search
None
See application file for complete search history.

(56) References Cited

U.S. PATENT DOCUMENTS

| 5,909,394 | A  | * | 6/1999 | Chou ................... 365/185.21 |
| 7,379,361 | B2 | * | 5/2008 | Co et al. ................... 365/201 |
| 7,756,194 | B1 | * | 7/2010 | O'Connor et al. ........... 375/150 |
| 2005/0076280 | A1 | | 4/2005 | Martinez |
| 2008/0052462 | A1 | * | 2/2008 | Blakely et al. ............... 711/115 |
| 2008/0086588 | A1 | | 4/2008 | Danilak et al. |
| 2011/0131369 | A1 | | 6/2011 | Eleftheriou et al. |

OTHER PUBLICATIONS

Differential Signaling, Sep. 2006, p. 1.
Office Action dated Mar. 1, 2012, pp. 20, for U.S. Appl. No. 12/950,948, filed Nov. 19, 2010.
Response dated Jun. 1, 2012, pp. 12 to Office Action dated Mar. 1, 2012, pp. 20, for U.S. Appl. No. 12/950,948, filed Nov. 19, 2010.

(Continued)

*Primary Examiner* — Henry Tsai
*Assistant Examiner* — Dean Phan
(74) *Attorney, Agent, or Firm* — David W. Victor; Konrad Raynes Davda & Victor LLP

(57) ABSTRACT

A logic device for communicating with a memory package with a first protocol, communicating with a memory controller with a second protocol, and for performing a protocol conversion between the first and the second protocol.

18 Claims, 5 Drawing Sheets

(56) References Cited

OTHER PUBLICATIONS

Final Office Action dated Aug. 30, 2012, pp. 18, for U.S. Appl. No. 12/950,948, filed Nov. 19, 2010.
RCE/Amendment dated Nov. 26, 2012, pp. 13 to Final Office Action dated Aug. 30, 2012, pp. 18, for U.S. Appl. No. 12/950,948, filed Nov. 19, 2010.
Office Action dated May 28, 2013, pp. 20, for U.S. Appl. No. 12/950,948, filed Nov. 19, 2010.
Response dated Aug. 28, 2013, pp. 14 to Office Action dated May 28, 2013, pp. 20, for U.S. Appl. No. 12/950,948, filed Nov. 19, 2010.
Final Office Action dated Sep. 23, 2013, pp. 27, for U.S. Appl. No. 12/950,948, filed Nov. 19, 2010.
RCE/Amendment dated Jan. 23, 2014, pp. 15 to Final Office Action dated Sep. 23, 2013, pp. 27, for U.S. Appl. No. 12/950,948, filed Nov. 19, 2010.
Notice of Allowance dated Aug. 1, 2014, pp. 20, for U.S. Appl. No. 12/950,948, filed Nov. 19, 2010.

* cited by examiner

LOGIC DEVICE

CROSS-REFERENCE TO RELATED FOREIGN APPLICATION

This application is a continuation of U.S. application Ser. No. 12/950,948, filed Nov. 19, 2010, which is a non-provisional application that claims priority benefits under Title 35, United States Code, Section 119(a)-(d) from European Patent Application entitled "LOGIC DEVICE" by Xiaoyu HU, Robert HAAS, Peter MUELLER, and Evangelos S. ELEFTHERIOU, having European Patent Application Serial No. 09177357.2, filed on Nov. 27, 2009, which European and U.S. Patent Applications are incorporated herein by reference in their entirety.

BACKGROUND OF THE INVENTION

1. Field of the Invention

The present invention relates to a logic device for interfacing between a memory controller and a memory package. The invention further relates to a memory controller. The invention further relates to a memory system. The invention further relates to a corresponding method.

2. Description of the Related Art

Solid-state based storage devices are becoming increasingly popular due to their low power consumption, ruggedness and high input-output (IO) performance compared to conventional hard disc drives. Most current solid-state storage devices are based on NAND-Flash memory chips.

A typical configuration of a solid-state-based storage system comprises at least one memory controller and one or more memory packages coupled to the memory controller through a serial memory interface. Each memory package is typically composed out of one or more dies, each of which typically offers a capacity of two GB. Memory packages are accessed by sending multi-step commands over the multiplexed memory interface. Each command consists of command codes, addresses and data. The memory interface typically needs 24 pins and currently is the main bottleneck for IO performance.

A conventional approach to achieve better IO performance is parallelism. A memory controller may be coupled to multiple memory packages via multiple independent memory interfaces. This allows the memory controller to simultaneously read or write data to multiple memory packages coupled to different memory interfaces. This approach requires a high number of pins and lines for each memory interface.

SUMMARY

According to an embodiment of the present invention, a logic device for communicating with a first memory package with a first protocol and for communicating with a memory controller with a second protocol is designed for performing a protocol conversion between the first and the second protocol. This logic device may allow for communicating with a conventional memory package. At the same time the logic device may communicate with the memory controller at an increased data rate compared to conventional designs.

The logic device may be designed for communicating with the first memory package through a first memory interface. This may allow for combining the logic device with conventional memory packages.

The logic device may be adapted for communicating with a second memory package through the first memory interface. This may allow for increasing the storage capacity without having to provide an additional memory interface.

The logic device may be designed for communicating with a third memory package through a second memory interface. This may allow the logic device for exchanging data with the first memory package and the third memory package simultaneously.

The logic device may be adapted for being arranged on a printed circuit board together with the first memory package. This may allow for higher integration and thus reduced costs of production.

The logic device may be adapted for interfacing between the memory controller and the first memory package and for communicating with the memory controller through a differential signaling interconnect. The differential signaling interconnect can be operated at very high data rates. Furthermore, only very few pins and lines may be needed for the differential signaling interconnect. The differential signaling interconnect may allow for bridging relatively long distances between the memory controller and the logic device.

In a preferred embodiment the second protocol is a serialized protocol comprising command data, address data and user data. Such a serialized protocol can be transmitted through the differential signaling interconnect at a very high data rate.

The logic device may be adapted for receiving a first data stream comprising first data from the memory controller, for de-serializing the first data of the first data stream, and for sending the first data to the first memory package. The logic device is then also designed for receiving second data from the first memory package, for serializing the second data into a second data stream, and for sending the second data stream to the memory controller. In this embodiment, the logic device essentially performs a protocol emulation, but it is not limited to. This may allow for a simple and cost-efficient design of the logic device.

The logic device may also comprise a buffer memory and be designed for storing data received from the memory controller in the buffer memory, and for sending data stored in the buffer memory to the first memory package. The logic device is then also designed for storing data received from the first memory package in the buffer memory, and for sending data stored in the buffer memory to the memory controller.

The differential signaling interconnect may comprise two lines for sending data from the logic device to the memory controller and may also comprise two further transmission lines for sending data from the memory controller to the logic device. Such a low number of required transmission lines may be advantageous.

The differential signaling interconnect may also comprise at least one line for power-down control and/or JTAG-control and/or distributing a reference clock signal. This may allow for additional features.

The logic device may be adapted to emulate the behavior of a memory controller towards the first memory package. This allows for using a conventional memory package together with the logic device.

In one embodiment, the first memory package is a Flash memory package. A memory controller according to an embodiment of the present invention is designed for communicating with a logic device through a differential signaling interconnect. The logic device is then designed for communicating with a first memory package.

A memory system according to an embodiment of the present invention comprises a first memory package, a logic device according to embodiments of the present invention and a memory controller according to an embodiment of the present invention. The memory system may be designed for being a hot or cold replicable memory card.

According to an embodiment of the invention there is provided a method for interconnecting a first memory package with a memory controller by means of a logic device, the method comprising
communicating between the first memory package and the logic device with a first protocol,
communicating between the memory controller and the logic device with a second protocol,
performing by the logic device a protocol conversion between the first and the second protocol.

BRIEF DESCRIPTION OF THE DRAWINGS

Preferred embodiments of the invention are described in detail below, by way of example only, with reference to the following schematic drawings. The drawings are provided for illustrative purpose only and do not necessarily represent practical examples of the present invention to scale. In the Figures, same reference signs are used to denote the same or like parts.

DETAILED DESCRIPTION

Embodiments of the present invention may be applied to Flash memory as well as to other storage class solid state technologies like phase change memory (PCM). In the embodiments described in the following, a Flash memory is used for means of exemplification. This does not limit the scope of the invention. It will be clear to one of skill in the art that the Flash memory may equally be replaced by other technologies.

Figure 1:
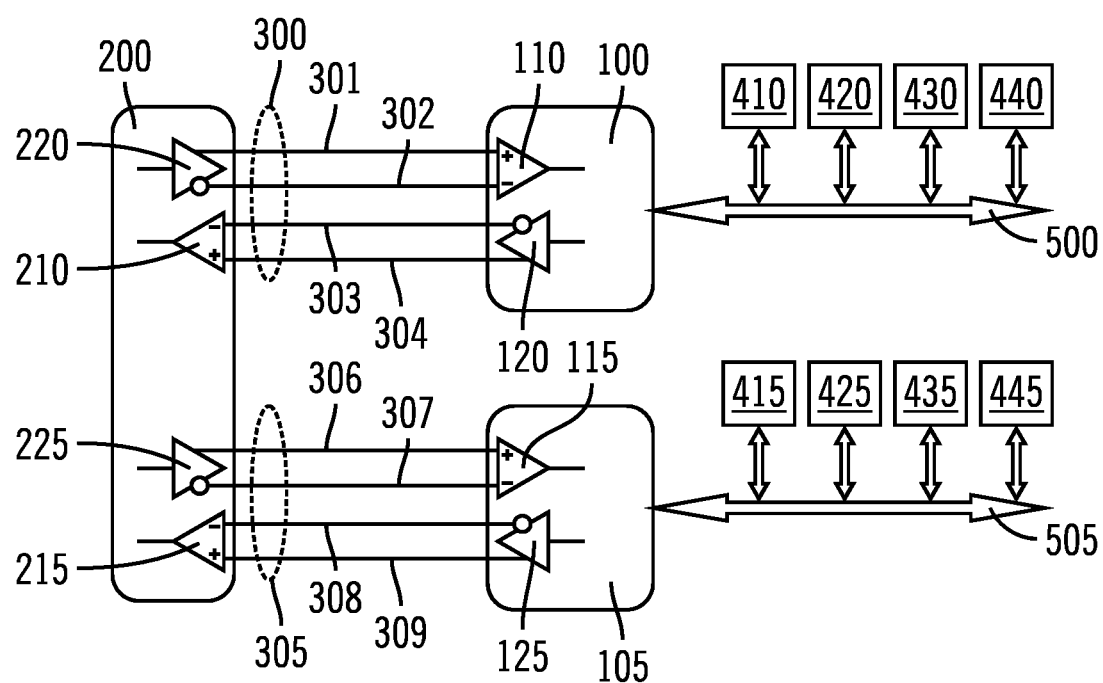
FIG. 1 depicts a Flash memory system with a logic device according to a first embodiment of the present invention.

FIG. 1 shows a simplified schematic view of a Flash memory system. The Flash memory system may for example serve as a replacement for a hard disk drive. The Flash memory system may also be designed as a Flash memory card that is hot or cold replicable. The Flash memory system comprises a Flash memory controller 200. The Flash memory controller 200 is designed for interfacing between the Flash memory system and an external host system, such as a mainboard of a personal computer. The personal computer may then save data in the Flash memory system and retrieve data from the Flash memory system through the Flash memory controller 200.

The Flash memory controller 200 is coupled to one or more logic devices. In the example of FIG. 1, the Flash memory controller 200 is coupled to a first logic device 100 and a second logic device 105. The first logic device 100 and the second logic device 105 are constructed equally. The first logic device 100 is coupled to the Flash memory controller 200 through a first differential signaling interconnect 300. The second logic device 105 is coupled to the Flash memory controller 200 through a second differential signaling interconnect 305.

The first differential signaling interconnect 300 comprises a first positive input line 301, a first negative input line 302, a first positive output line 303 and a first negative output line 304. The first input lines 301, 302 are provided for sending data from the Flash memory controller 200 to the first logic device 100. The first output lines 303, 304 are provided for sending data from the first logic device 100 to the Flash memory controller 200. The Flash memory controller 200 comprises a first output stage 220. The first logic device 100 comprises a first input stage 110. The first input lines 301, 302 are arranged between the first output stage 220 of the Flash memory controller 200 and the first input stage 110 of the first logic device 100. The Flash memory controller 200 further comprises a first input stage 210. The first logic device 100 further comprises a first output stage 120. The first output lines 303, 304 are arranged between the first output stage 120 of the first logic device 100 and the first input stage 210 of the Flash memory controller 200.

The Flash memory controller 200 further comprises a second output stage 225 and a second input stage 215. The second logic device 105 comprises a second input stage 115 and a second output stage 125. The second differential signaling interconnect 305 comprises a second positive input line 306 and a second negative input line 307. The second input line 306, 307 are arranged between the second output stage 225 of the Flash memory controller 200 and the second input stage 115 of the second logic device 105. The second differential signaling interconnect 305 further comprises a second positive output line 308 and a second negative output line 309. The second output lines 308, 309 are arranged between the second output stage 125 of the second logic device 105 and the second input stage 215 of the Flash memory controller 200. The second input lines 306, 307 are provided for sending data from the Flash memory controller 200 to the second logic device 105. The second output line 308, 309 are arranged for sending data from the second logic device 105 to the Flash memory controller 200.

The transmission lines 301, 302, 303, 304, 306, 307, 308, 309 of the first and second differential interconnects 300, 305 may comprise a relatively long length.

Figure 2:
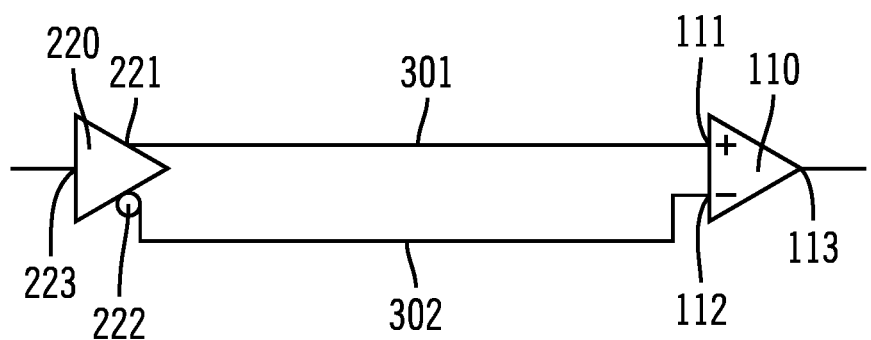
FIG. 2 shows a part of a differential signaling interconnect.

FIG. 2 schematically shows a magnified portion of the first differential signaling interconnect 300. FIG. 2 shows the first output stage 220 of the Flash memory controller 200 and the first input stage 110 of the first logic device 100. The first output stage 220 may for example be an amplifier. The first output stage 220 comprises an input terminal 223, an output terminal 221 and an inverted output terminal 222. The first input stage 110 may, for example, be a differential amplifier. The first input stage 110 comprises a positive input terminal 111, a negative input terminal 112 and an output terminal 113. The first positive input line 301 of the first differential signaling interconnect 300 connects the output terminal 221 of the first output stage 220 with the positive input terminal 111 of the first input stage 110. The first negative input line 302 connects the inverted output terminal 222 of the first output stage 220 with the negative input terminal 112 of the first input stage 110.

Figure 3:
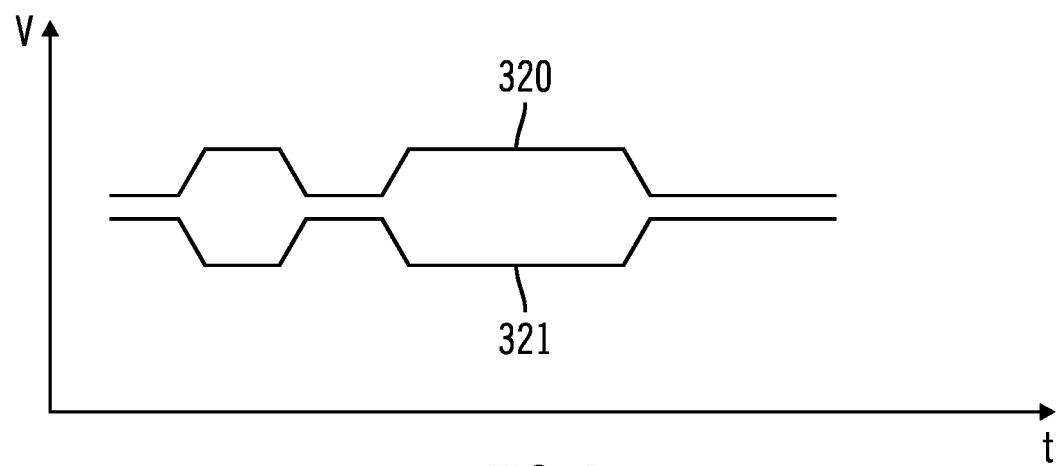
FIG. 3 schematically shows a timing diagram of signal voltages on two transmission lines of a differential signaling interconnect.

FIG. 3 schematically shows voltage levels on the first positive input line 301 and the first negative input line 302 as a function of time. The horizontal axis depicts increasing time in arbitrary units. The vertical axis depicts voltage levels in arbitrary units. A first curve in FIG. 3 depicts a positive signal voltage 320 on the first positive input line 301. A second curve depicts a negative signal voltage 321 on the first negative input line 302. At several points in time, the voltage signals 320, 321 synchronously change in opposite directions. When the positive signal voltage 320 on the first positive input line 301 increases from a lower to a higher level, the negative signal voltage 321 on the first negative input line 302 at the same time decreases from a higher level to a lower level. When the positive signal voltage 320 on the first positive input line 301 decreases from a higher level to a lower level, the negative signal voltage 321 on the first negative input line 302 at the same time changes from a lower level to a higher level. The higher and lower levels of the positive signal voltage 320 and the higher and lower levels of the negative signal voltage 321 may for example be 1.4 Volts and 1.0 Volts, respectively.

FIG. 1 further shows that the first logic device 100 is coupled to a plurality of Flash memory packages through a first Flash memory interface 500. In the example of FIG. 1, the first logic device 100 is coupled to four Flash memory packages 410, 420, 430, 440 through the first Flash memory interface 500. The number of Flash memory packages coupled to the first logic device 100 through the first Flash memory interface 500 may, however, be different than four. The first logic device 100 may, for example, be coupled to one, two, four, eight or any other number of Flash memory packages through the first Flash memory interface 500.

The second logic device 105 is coupled to a plurality of Flash memory packages through a second Flash memory interface 505. In the example of FIG. 1, the second logic device 105 is coupled to four Flash memory packages 415, 425, 435, 445 through the second Flash memory interface 505. The number of Flash memory packages coupled to the second logic device 105 may however be different from four.

Each Flash memory package 410, 415, 420, 425, 430, 435, 440, 445 may be composed out of one or more chip dies. Each die may for example offer a storage capacity of 2 GB. The memory of each die may be further divided into blocks of 256 KB. Each block may be composed out of 64 pages of 4 KB each.

The Flash memory interfaces 500, 505 are designed as multiplexed buses. Each Flash memory interface 500, 505 may for example comprise 24 individual transmission lines for exchanging commands, addresses and data between the logic devices 100, 105 and the Flash memory packages 410, 415, 420, 425, 430, 435, 440, 445.

Data reads and writes from and to the Flash memory packages 410, 415, 420, 425, 430, 435, 440, 445 are performed at page granularity. If data is to be read from a die of the first Flash memory package 410, it may take 25 µs to read a page of data from the memory cells of a die of the Flash memory package 410 into a data buffer attached to this die. In the next step, this data is transmitted from the data buffer to the first logic device 100 through the first Flash memory interface 500. The first Flash memory interface 500 transfers data at typically 25 ns per byte, or roughly 100 µs per page. During the transfer of the data from the Flash memory package 410 to the first logic device 100, the first Flash memory interface 500 is occupied and not available for competing data transfers to or from the Flash memory packages 420, 430, 440.

If data is to be written to a die of the Flash memory package 410, a page of data is first transferred from the first logic device 100 to the data buffer attached to the die of the Flash memory package 410 through the first Flash memory interface 500, which takes about 100 µs. The data is then written out to the individual memory cells of the die, which takes about another 200 µs. During these 300 µs, the first Flash memory interface 500 is occupied and not available for competing data transfers to or from the Flash memory packages 420, 430, 440.

The logic devices 100, 105 perform a protocol conversion or protocol emulation. The first logic device 100 for example receives signals and data from the first Flash memory interface 500, serializes these signals and data into a first serial data stream and sends the first serial data stream to the Flash memory controller 200 via the first differential signaling interconnect 300. Accordingly, the first logic device 100 is designed for receiving a second serial data stream comprising commands, addresses and data from the Flash memory controller 200, for de-serializing the second data stream and for sending the commands, addresses and data from the second data stream to the Flash memory packages 410, 420, 430, 440 through the first Flash memory interface 500. The second logic device 105 acts accordingly. The second logic device 105 may receive a third serial data stream from the Flash memory controller 200, de-serialize the third serial data stream and send the data of the third data stream to the Flash memory packages 415, 425, 435, 445 through the second Flash memory interface 505. The second logic device 105 may also receive data from one of the Flash memory packages 415, 425, 435, 445 through the second Flash memory interface 505, serialize that data into a fourth serial data stream and send that fourth serial data stream to the Flash memory controller 200 through the second differential signaling interconnect 305.

An advantage of the Flash memory system depicted in FIG. 1 is that the differential signaling interconnects 300, 305 each comprise only very few lines and may span a relatively large distance, including connectors. Furthermore, the differential signaling interconnects 300, 305 allow for very high data rates.

Figure 4:
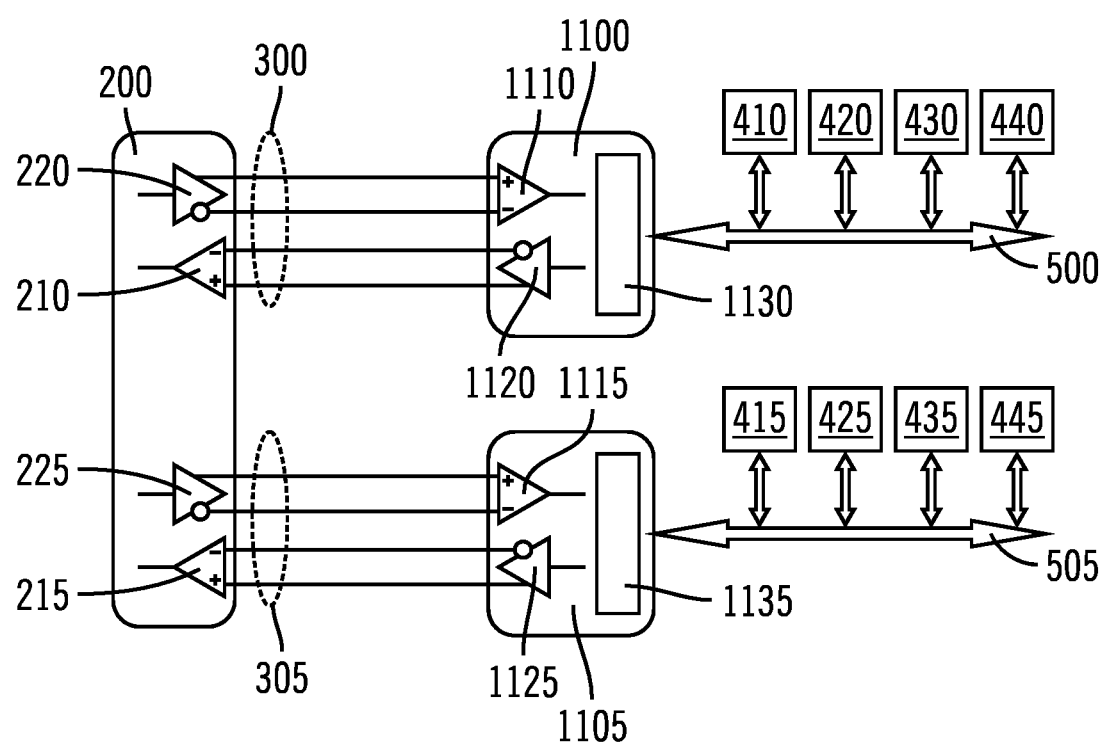
FIG. 4 shows a Flash memory system with a logic device according to a second embodiment of the present invention.

FIG. 4 schematically shows a Flash memory system according to a second embodiment. The Flash memory system of FIG. 4 again comprises a plurality of Flash memory packages 410, 420, 430, 440 coupled to a first Flash memory interface 500 and a plurality of Flash memory packages 415, 425, 435, 445 coupled to a second Flash memory interface 505. The first Flash memory interface 500 is coupled to a first logic device 1100. The second Flash memory interface 505 is coupled to a second logic device 1105.

The Flash memory system of FIG. 4 further comprises a Flash memory controller 200. The Flash memory controller 200 is coupled to the first logic device 1100 through a first differential signaling interconnect 300. The Flash memory controller 200 is coupled to the second logic device 1105 through a second differential signaling interconnect 305. The Flash memory controller 200 comprises a first output stage 220, a first input stage 210, a second output stage 225 and a second input stage 215. The first logic device 1100 comprises an input stage 1110 and an output stage 1120. The second logic device 1105 comprises an input stage 1115 and an output stage 1125. Two transmission lines of the first differential signaling interconnect 300 couple the first output stage 220 of the Flash memory controller 200 with the input stage 1110 of the first logic device 1100. Two transmission lines of the first differential signaling interconnect 300 couple the output stage 1120 of the first logic device 1100 with the first input stage 210 of the Flash memory controller 200. Two transmission lines of the second differential signaling interconnect 305 couple the second output stage 225 of the Flash memory controller 200 with the input stage 1115 of the second logic device 1105. Two transmission lines of the second differential signaling interconnect 305 couple the output stage 1125 of the second logic device 1105 with the second input stage 215 of the Flash memory controller 200.

The first logic device 1100 of FIG. 4 differs from the first logic device 100 of FIG. 1 in that it comprises a first buffer memory 1130. The second logic device 1105 of FIG. 4 differs from the second logic device 105 of FIG. 1 in that it comprises a second buffer memory 1135.

The first logic device 1100 not only performs protocol conversion, but it is also designed to store commands and data received from the Flash memory controller 200 in the first buffer memory 1130. If, for example, the first Flash memory interface 500 is still busy transferring data from a previous read or write command while the first logic device 1100 receives another command from the Flash memory controller 200, the first logic device 1100 may store that command and associated data in the first buffer memory 1130. If later the first Flash memory interface 500 is available again, the first logic device 1100 may fetch that command and the associated data from the first buffer memory 1130 and process that command. The first logic device 1100 is also designed to store data received from the Flash memory packages 410, 420, 430, 440 in the first buffer memory 1130, before passing that data on to the Flash memory controller 200.

The second logic device 1105 is equally designed to store commands and data received from the Flash memory controller 200 in the second buffer memory 1135, before passing it on to one of the Flash memory packages 415, 425, 435, 445. The second logic device 1105 may also store commands and data received from one of the Flash memory packages 415, 425, 435, 445 in the second buffer memory 1135 before passing it on to the Flash memory controller 200.

Figure 5:
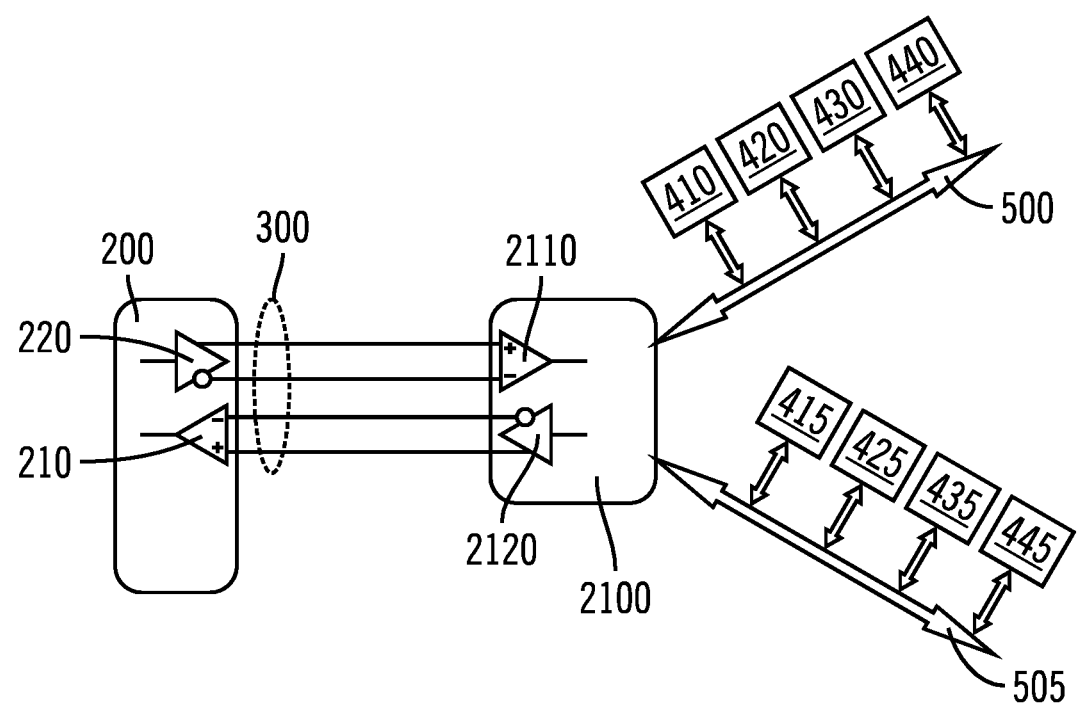
FIG. 5 shows a Flash memory system with a logic device according to a third embodiment of the present invention.

FIG. 5 schematically depicts a Flash memory system according to a third embodiment. The Flash memory system of FIG. 5 comprises a Flash memory controller 200 and a logic device 2100. The Flash memory controller 200 comprises an output stage 220 and an input stage 210. The logic device 2100 comprises an input stage 2110 and an output stage 2220. The Flash memory controller 200 and the logic device 2100 are coupled by a differential signaling interconnect 300. Two lines of the differential signaling interconnect 300 couple the output stage 220 of the Flash memory controller 200 with the input stage 2110 of the logic device 2100. Two further lines of the differential signaling interconnect 300 couple the output stage 2220 of the logic device 2100 with the input device 210 of the Flash memory controller 200.

The logic device 2100 is coupled to a first plurality of Flash memory packages 410, 420, 430, 440 through a first Flash memory interface 500. The logic device 2100 is further coupled to a second plurality of Flash memory packages 415, 425, 435, 445 through a second Flash memory interface 505. The Flash memory system of FIG. 5 differs from the Flash memory systems of FIGS. 1 and 4 in that the logic device 1100 is coupled to two Flash memory interfaces 500, 505. The logic device 2100 may also be coupled to further Flash memory packages through further Flash memory interfaces.

An advantage of the Flash memory system of FIG. 5 is that the logic device 2100 may exchange data with the Flash memory packages 410, 415, 420, 425, 430, 435, 440, 445 simultaneously via the first and second Flash memory interfaces 500, 505. As the differential signaling interconnect 300 allows for higher data rates than the Flash memory interfaces 500, 505, the logic device 2100 may execute read commands from for example the Flash memory package 410 coupled to the first Flash memory interface 500 and the Flash memory package 415 coupled to the second Flash memory interface 505 at the same time and send the data received from the Flash memory interfaces 500, 505 to the Flash memory controller 200 via the differential signaling interconnect 300 in a timely manner. The logic device 2100 may or may not comprise a buffer memory for storing commands and data for processing them later.

The differential signaling interconnect 300 of FIGS. 1, 2, 4 and 5 can adapt to any physical serial interconnect standard, such as the standards known for serial ATA or PCI-e. The serial protocol used on the differential signaling interconnect 300 may be customized, but it may also include or emulate any known serial protocol. The differential signaling interconnect 300 may, in addition to the input lines 301, 302 and the output lines 303, 304, comprise additional lines for allowing additional features such as power-down control, JTAG control, and for distributing a reference clock.

The logic devices 100, 105, 1100, 1105, 2100 may also be integrated or packaged together with Flash dies. In this embodiment, the Flash memory controller 200 can be omitted and the differential signaling interconnect 300, 305 becomes the external interface of the Flash memory system.

Figure 6:
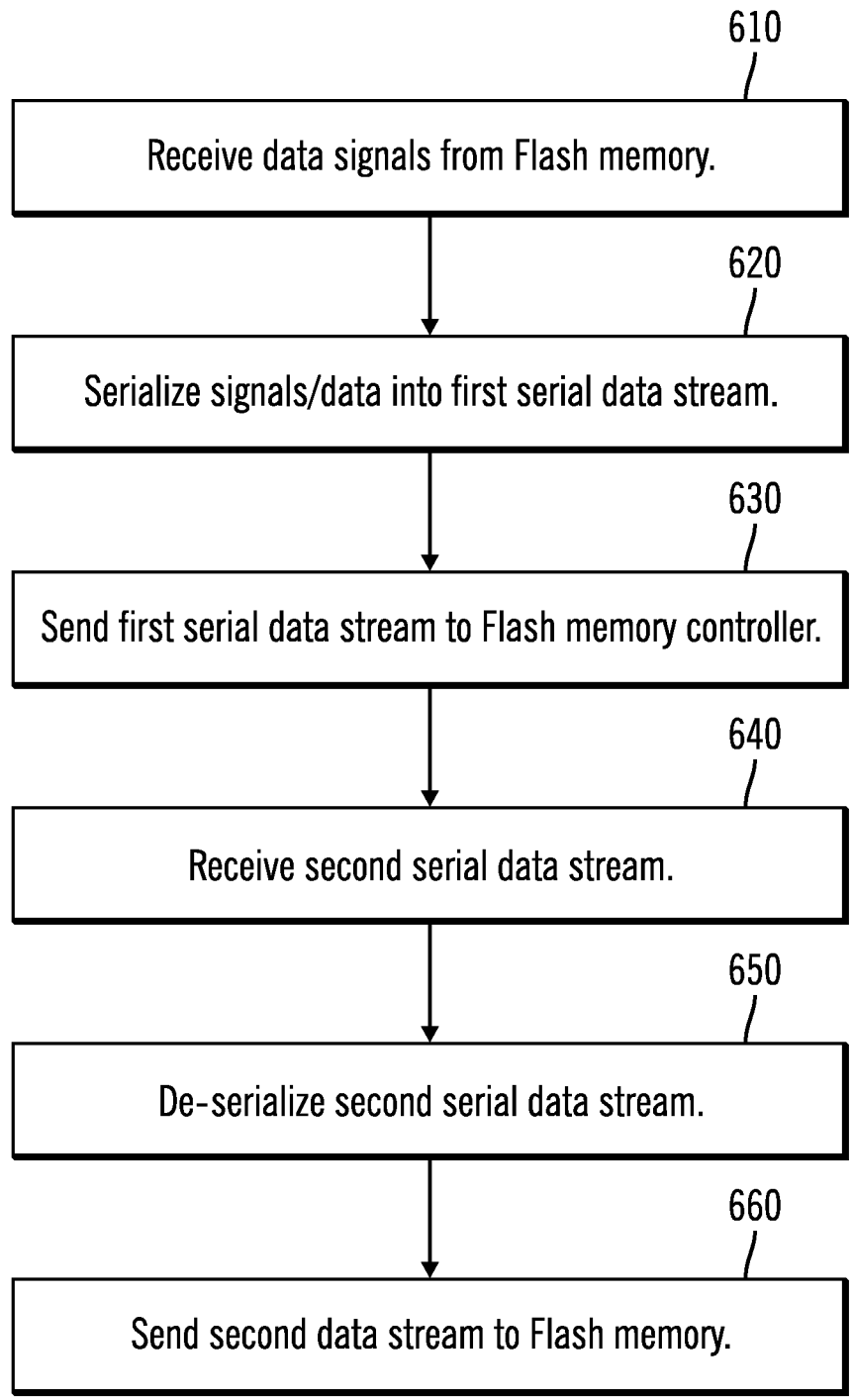
FIG. 6 illustrates a method according to an embodiment of the present invention.

FIG. 6 illustrates a method according to an embodiment of the present invention. The method is illustrated with respect to the Flash memory system of FIG. 1. In step 610 the first logic device 100 for example receives signals and data from the first Flash memory interface 500. In step 620 the logic device 100 serializes these signals and data into a first serial data stream, thereby performing a protocol conversion. In step 630 the logic device 100 sends the first serial data stream to the Flash memory controller 200 via the first differential signaling interconnect 300. In step 640 the first logic device 100 receives a second serial data stream comprising commands, addresses and data from the Flash memory controller 200. In step 650 the logic device 100 de-serializes the second data stream, thereby performing a protocol conversion. In step 660 the logic device 100 sends the commands, addresses and data from the second data stream to the Flash memory packages 410, 420, 430, 440 through the first Flash memory interface 500.

What is claimed:

1. A system coupled to memory packages and a memory controller, comprising:
    a first logic device connected to the memory controller via first lines extending from the first logic device to the memory controller, wherein the first logic device includes a first buffer, and configured to:
        communicate with a first set of memory packages with a first protocol over a first interface, wherein the first set of memory packages comprise Flash memory;
        communicate with the memory controller with a second protocol;
        perform a first protocol conversion between the first and the second protocols to transmit commands, addresses and data between the memory controller and the first set of memory packages;
        storing commands and data in the first buffer from the memory controller while the first interface is busy transferring data from a previous read or write command; and
        in response to the first interface becoming available, fetching commands and data from the first buffer to process; and
    a second logic device connected to the memory controller via second lines extending from the second logic device to the memory controller, wherein the second logic device includes a second buffer, and configured to:
        communicate with a second set of memory packages with the first protocol over a second interface;
        communicate with the memory controller with the second protocol;
        perform a second protocol conversion between the first and the second protocols to transmit commands, addresses and data between the memory controller and the second set of memory packages;

storing commands and data received from the memory controller before passing to the second set of memory packages over the second interface; and storing commands and data received from one of the second set of memory packages before passing to the memory controller, wherein the first and second lines further comprise additional lines for power-down control and distributing a reference clock signal.

2. The system of claim 1, wherein the second protocol is a serialized protocol comprising command data, address data and user data.

3. The system of claim 1, wherein the first logic device is further configured to:
receive a first data stream comprising first data from the memory controller;
de-serialize the first data of the first data stream;
send the first data to the first set of memory packages;
receive second data from the first set of memory packages;
serialize the second data into a second data stream; and
send the second data stream to the memory controller; and wherein the second logic device is further configured to:
receive a third data stream comprising third data from the memory controller;
de-serialize the third data of the first data stream;
send the third data to the second set of memory packages;
receive fourth data from the second set of memory packages;
serialize the fourth data into a fourth data stream; and
send the fourth data stream to the memory controller.

4. The system of claim 1, wherein the first and second logic devices emulate behavior of a memory controller towards the first and second sets of memory packages, respectively.

5. The system of claim 1, wherein the first lines comprise a first differential signaling interconnect including a first positive input line, a first negative input line, a first positive output line, and a first negative output line.

6. The system of claim 5, wherein the second lines comprise a second signaling differential signaling interconnect including a second positive input line, a second negative input line, a second positive output line, and a second negative output line.

7. The system of claim 5, wherein the first positive and negative input lines are provided for sending data from the memory controller to the first logic device and wherein the first positive and negative output lines are provided for sending data from the first logic device to the memory controller.

8. The system of claim 1, wherein at least one of the first and second sets of memory packages includes a data buffer attached to the memory packages to buffer data being transferred to and from memory cells of the attached memory packages.

9. A method for interconnecting memory packages with a memory controller, comprising:
communicating, by a first logic device, with a first set of memory packages with a first protocol over a first interface, wherein the first logic device includes a first buffer, wherein the first set of memory packages comprise Flash memory;
communicating, by the first logic device, with the memory controller with a second protocol over a first set of lines extending from the first logic device to the memory controller;
performing, by the first logic device, a protocol conversion between the first and the second protocols to transmit commands, addresses and data between the memory controller and the first set of memory packages;
storing commands and data in the first buffer from the memory controller while the first interface is busy transferring data from a previous read or write command;
in response to the first interface becoming available, fetching commands and data from the first buffer to process;
communicating, by a second logic device, with a second set of memory packages with the first protocol over a second interface, wherein the second logic device includes a second buffer;
communicating, by the second logic device, with the memory controller with the second protocol over a second set of lines extending from the second logic device to the memory controller;
performing, by the second logic device, a protocol conversion between the first and the second protocols to transmit commands, addresses and data between the memory controller and the second set of memory packages;
storing commands and data received from the memory controller before passing to the second set of memory packages over the second interface; and
storing commands and data received from one of the second set of memory packages before passing to the memory controller, wherein the first and second sets of lines further comprise additional lines for power-down control and distributing a reference clock signal.

10. The method of claim 9, wherein communicating with the first and second sets of memory packages comprises:
receiving, by the first logic device, from the first set of memory packages, signals and data;
performing, by the first logic device, a protocol conversion with the first protocol to serialize the signals and data from the memory controller into a first serial data stream
sending, by the first logic device, the first serial data stream to the memory controller;
receiving, by the second logic device, from the second set of memory packages, signals and data;
performing, by the second logic device, a protocol conversion with the first protocol to serialize the signals and data from the memory controller into a second serial data stream; and
sending the second serial data stream to the memory controller.

11. The method of claim 10, wherein the protocol conversion comprises a first protocol conversion, and wherein communicating with the memory controller comprises:
receiving from the memory controller a third serial data stream comprising commands and data;
performing a second protocol conversion with the second protocol to de-serialize the third serial data stream; and
sending the commands and data from the de-serialized third serial data stream to the first set of memory packages.

12. The method of claim 9, wherein the first set of lines comprise a first differential signaling interconnect including a first positive input line, a first negative input line, a first positive output line, and a first negative output line.

13. The method of claim 12, wherein the second set of lines comprise a second signaling differential signaling interconnect including a second positive input line, a second negative input line, a second positive output line, and a second negative output line.

14. The method of claim 12, wherein the first positive and negative input lines are provided for sending data from the memory controller to the first logic device and wherein the first positive and negative output lines are provided for sending data from the first logic device to the memory controller.

15. A logic device including a buffer coupled to memory packages and a memory controller, wherein the logic device is configured to:
communicate, using a first protocol, with a first set of memory packages over a first memory interface and with a second set of memory packages over a second memory interface, wherein the first set of memory packages comprise Flash memory;
communicate with the memory controller over lines using a second protocol, wherein the lines extend from the logic device to the memory controller, wherein the lines further comprise additional lines for power-down control and distributing a reference clock signal;
perform a protocol conversion between the first and the second protocols to transmit commands, addresses and data between the memory controller and the first and second sets of memory packages over the first and second memory interfaces, respectively;
storing commands and data in the buffer from the memory controller while the first memory interface is busy transferring data from a previous read or write command; and
in response to the first memory interface becoming available, fetching commands and data from the buffer to process.

16. The logic device of claim 15 wherein at least one of the first and second sets of memory packages includes a data buffer attached to the memory package to buffer data being transferred to and from memory cells of the attached memory packages.

17. The logic device of claim 15, wherein the lines comprise a differential signaling interconnect including a first positive input line, a first negative input line, a second positive output line, and a second negative output line.

18. The logic device of claim 17, wherein the first positive and negative input lines are provided for sending data from the memory controller to the logic device and wherein the second positive and second negative output lines are provided for sending data from the logic device to the memory controller.

* * * * *